United States Patent [19]
Katchka

[11] 3,860,170
[45] Jan. 14, 1975

[54] COMBINATION THERMOSTAT AND REGULATOR VALVE DEVICE

[75] Inventor: Jay R. Katchka, Cypress, Calif.

[73] Assignee: Robertshaw Controls Company, Richmond, Va.

[22] Filed: June 18, 1973

[21] Appl. No.: 371,016

[52] U.S. Cl.................. 236/92 A, 137/46, 137/495
[51] Int. Cl. ........................................... G05d 27/00
[58] Field of Search.............. 137/505, 46 X, 495 X; 236/92 A

[56] References Cited
UNITED STATES PATENTS
1,045,375   11/1912   Creveling....................... 137/505.46
2,898,928   8/1959   Kehoe........................... 236/92 A X Primary Examiner—Edward G. Favors
Attorney, Agent, or Firm—Anthony A. O'Brien

[57] ABSTRACT

A combination thermostat and regulator valve device for controlling fuel flow to an appliance in response to movement of a temperature responsive device including valve means having a valve member cooperating with a valve seat to control fuel flow between an inlet and an outlet of a casing, a closure member controlling the valve member and movable in response to movement of the temperature responsive device to move the valve member against the valve seat to close the valve means and to move away from the valve member to permit the valve member to move away from the valve seat to open the valve means and a regulator assembly including a lever movable in response to movement of a regulating diaphragm subject to outlet pressure to control movement of the valve member when the valve means is open such that the valve means provides on-off control in response to the temperature responsive device and pressure regulation in response to movement of the regulator assembly.

18 Claims, 8 Drawing Figures

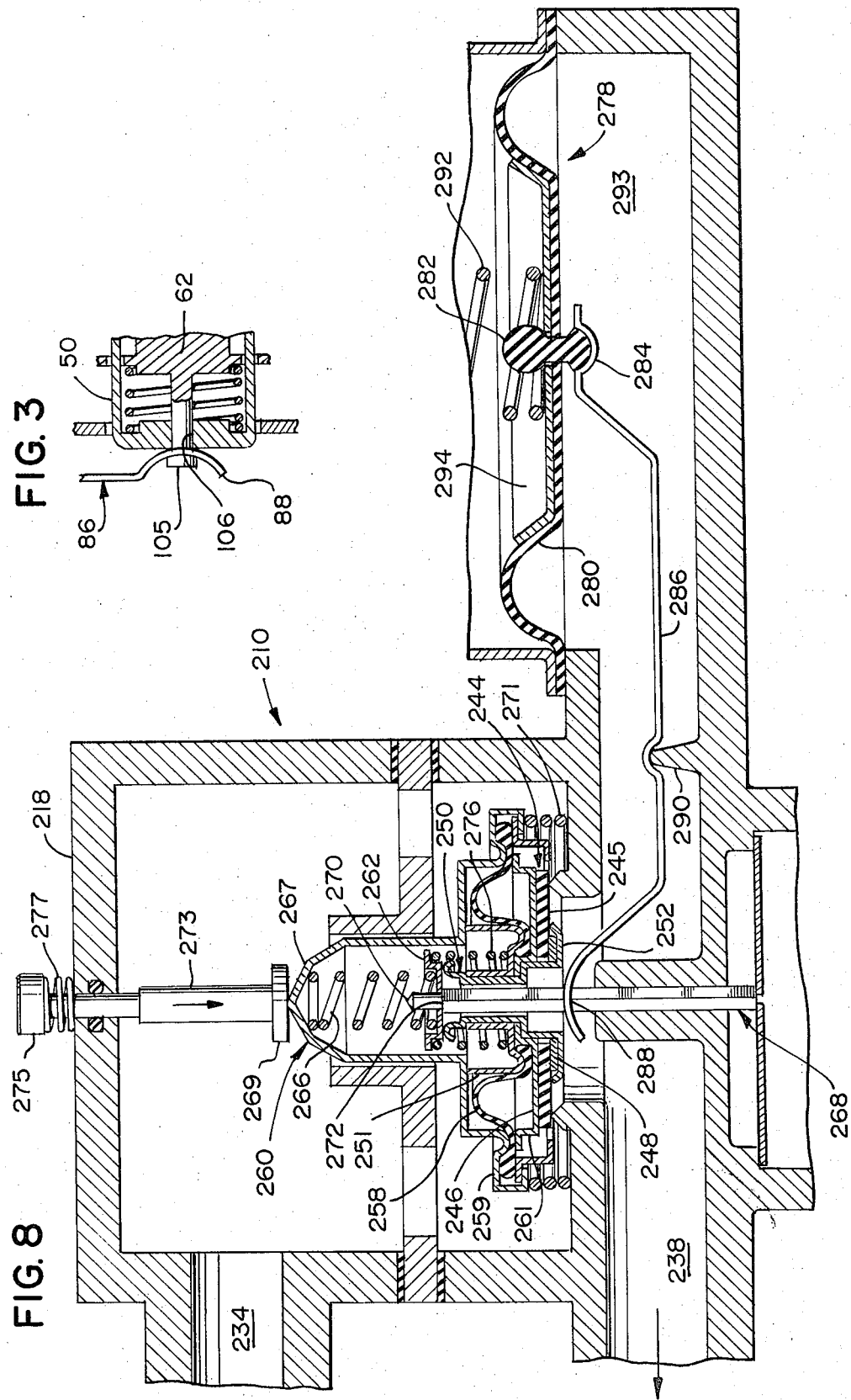

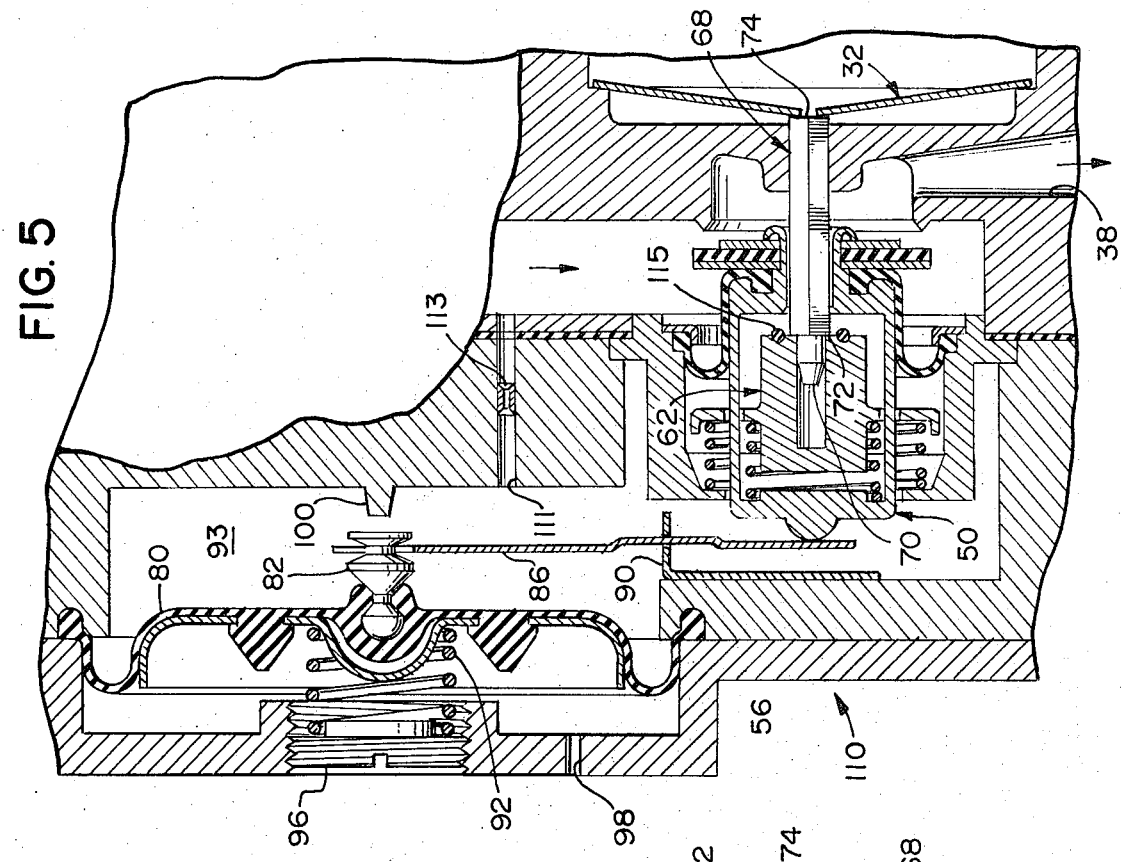
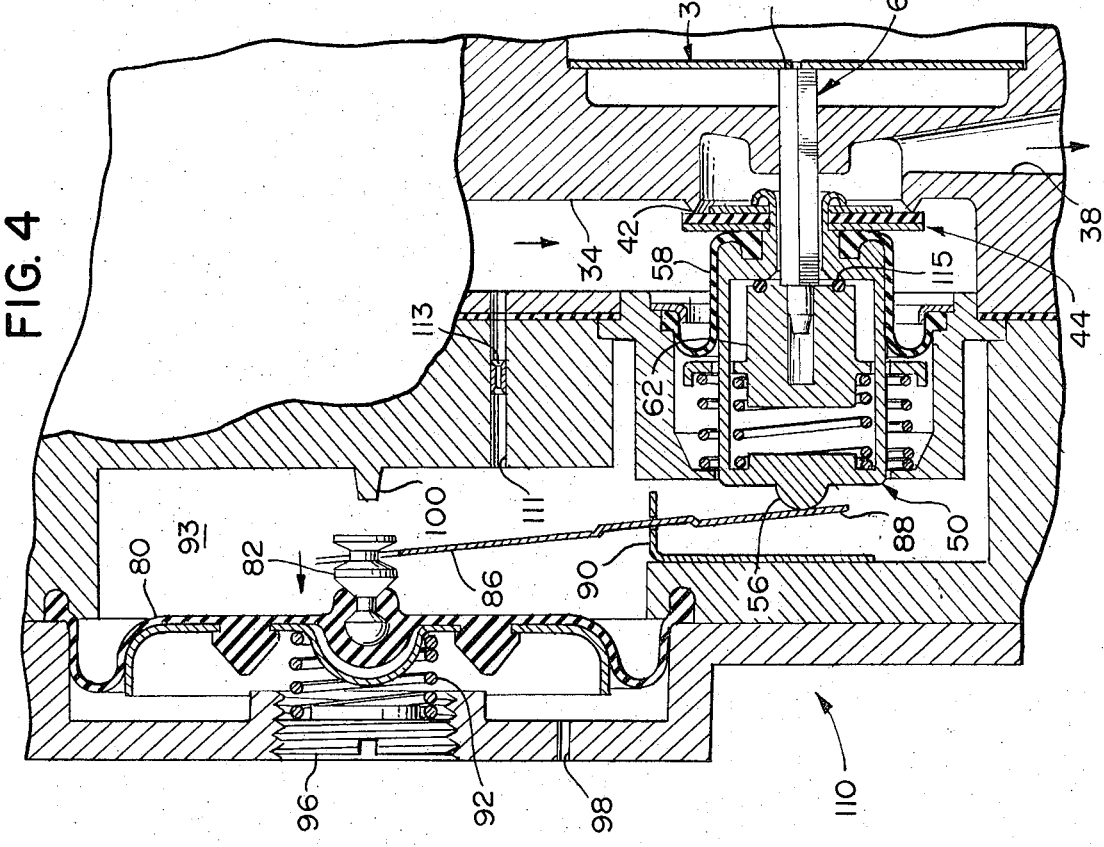

3,860,170

COMBINATION THERMOSTAT AND REGULATOR VALVE DEVICE

BACKGROUND OF THE INVENTION

1. Field of the Invention

The present invention pertains to thermostat control devices for supplying fuel to an appliance at a regulated pressure and, more particularly, to such control devices utilizing a single valve means to provide both thermostat and regulator operation.

2. Discussion of the Prior Art

Appliances utilizing a burner to heat a medium, such as water heaters, conventionally include a thermostatically controlled valve responsive to the temperature of the medium to be heated in order to control fuel supplied to the burner. Such appliances are desirably operated at a specific fuel pressure and, accordingly, a regulator is normally provided in the fuel flow line upstream of the thermostatic valve. In the past, such thermostat and regulator functions have each been provided by separate valve means, or such functions have been supplied by valve means including a diaphragm to provide pressure regulation by controlling pressure beneath the diaphragm and have required separate control valves and porting structure to operate the valve means. Accordingly, prior art control devices for providing thermostat and regulator operation have had the disadvantages of requiring overlapping and complex structure to accurately provide both thermostatic and pressure regulation control for an appliance and of being relatively expensive to manufacture and service due to the number of parts and separate valves and devices required.

SUMMARY OF THE INVENTION

The present invention is generally characterized in a combination thermostat and regulator valve device for controlling fuel flow to an appliance in response to movement of a temperature responsive device including a casing having an inlet for receiving fuel from a supply and an outlet for supplying fuel to the appliance; valve means including a valve seat formed in the casing and a valve member cooperating with the valve seat to control fuel flow through the casing between the inlet and the outlet; closure assembly controlling the valve member and movable in response to movement of the temperature responsive device to move the valve member against the valve seat to place the valve means in a closed state and to move away from the valve member to permit the valve member to move away from the valve seat to place the valve means in an open state; and a regulator assembly including a diaphragm movable in response to pressure at the outlet and means engaging the diaphragm and the valve means to transmit movement of the diaphragm in response to outlet pressure to the valve member when the valve means is in the open state to regulate pressure at the outlet whereby the valve means is responsive to the closure assembly and the regulator assembly to provide thermostat and regulator operation.

Accordingly, it is an object of the present invention to overcome the above mentioned disadvantages of the prior art by constructing a combination thermostat and regulator valve device utilizing a single valve means to provide thermostat and regulator operation.

Another object of the present invention is to utilize a single valve means to provide thermostat and regulator operation with the valve means directly controlled by movement of a temperature responsive device.

A further object of the present invention is to operate a valve means by movement of a closure member relative to a valve member of the valve means such that the closure member forces the valve member against a valve seat in a closed state and moves away from the valve member in an open state to permit the position of the valve member relative to the valve seat to be varied to permit pressure regulation.

An additional object of the present invention is to construct a combination thermostat and regulator valve device with a valve closure member movable relative to a valve operating member to permit a single valve means to provide thermostatic on-off control and outlet pressure regulation.

Some of the advantages of the present invention over the prior art are that the combination thermostat and regulator valve device of the present invention requires fewer parts, is less expensive to manufacture and service, provides precise pressure regulation with desired opening characteristics and has safe, normally closed operating characteristics thereby requiring fewer control parts.

Other objects and advantages of the present invention will become apparent from the following description of the preferred embodiments taken in conjunction with the accompanying drawings.

BRIEF DESCRIPTION OF THE DRAWINGS

FIG. 3 is a broken view of a modification of the combination thermostat and regulator valve device of FIGS. 1 and 2.

FIGS. 4 and 5 are broken sections of another embodiment of a combination thermostat and regulator valve device according to the present invention in closed and open states, respectively.

FIG. 8 is a broken section of the combined thermostat and regulator valve device of FIGS. 6 and 7 in a manually closed state.

DESCRIPTION OF THE PREFERRED EMBODIMENTS

Figure 2:
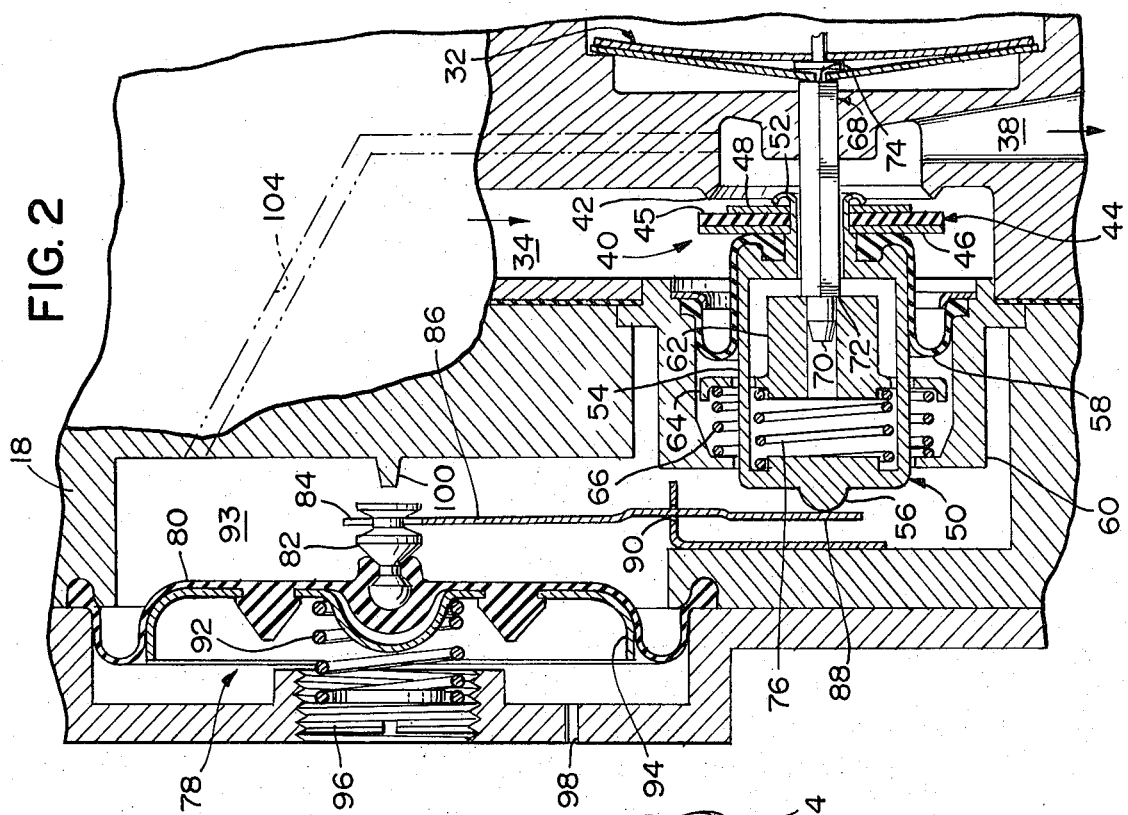
FIGS. 1 and 2 are broken sections of a combination thermostat and regulator valve device according to the present invention in closed and open states, respectively.
Figure 1:
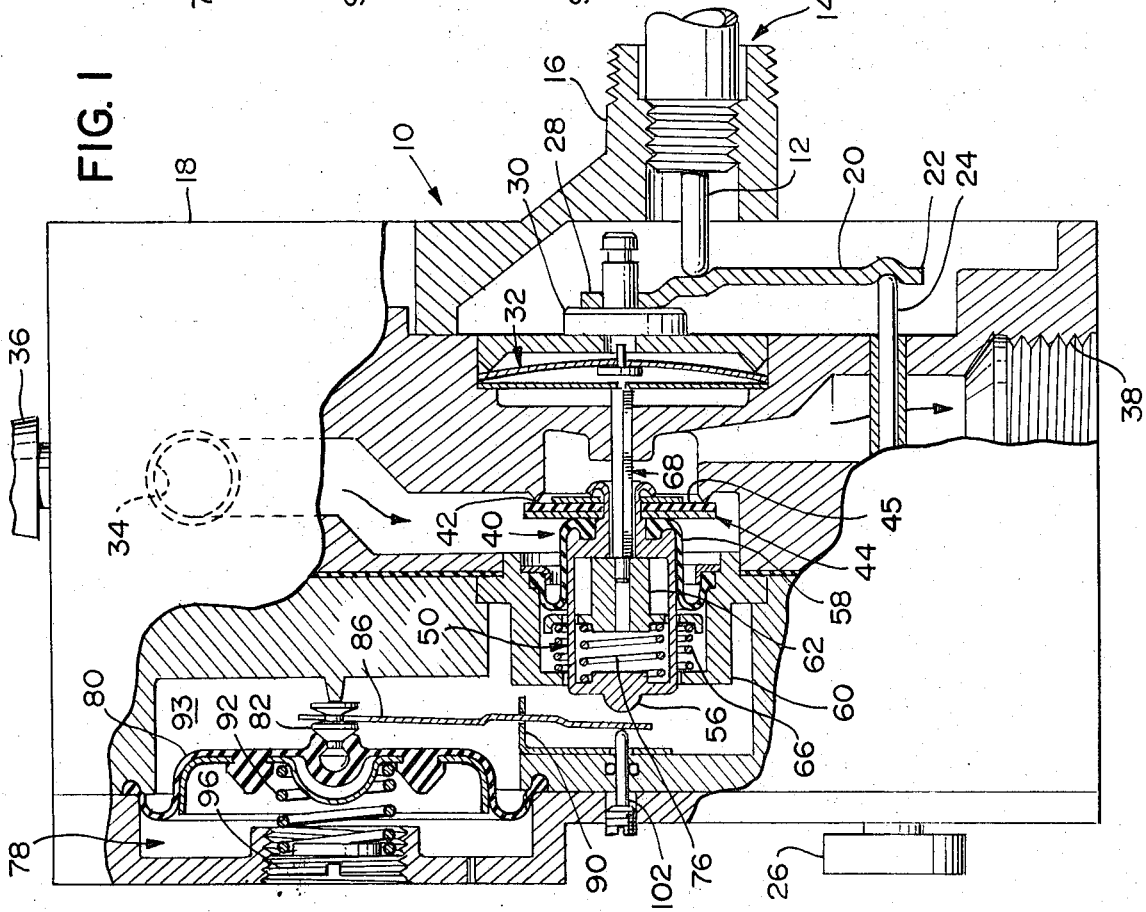

A combination thermostat and regulator valve device 10 according to the present invention is illustrated in FIGS. 1 and 2 with the device 10 illustrated in FIG. 1 as being responsive to axial movement of a rod 12 of a temperature responsive device 14 of the rod and tube type conventionally utilized to sense the temperature of water in a hot water heater. The temperature responsive device 14 normally includes a tube increasing and decreasing in length with temperature changes with the rod 12 secured thereto and movable therewith. Normally, the end of the rod 12 will move into the temperature responsive device 14 with increasing temperature and away from the temperature responsive device with decreasing temperature. The temperature responsive device is mounted on an appliance by means of a nipple or shank 16 which supports a casing 18 in which the combination thermostat and regulator valve device 10 of the present invention is housed. The end of rod 12 engages a central portion of a lever 20 which has an end 22 abutting a fulcrum positioning member 24 which has a variable position under the control of a knob 26 to permit adjustment of the set temperature. Lever 20 has an opposite end 28 carrying a plunger 30 for operating an overcenter clicker assembly 32, the clicker assembly 32 being normally biased to the off position, as illustrated in FIG. 1, and having a disc movable overcenter to an on position, as illustrated in FIG. 2, as is conventional. While the present invention is described which utilized with a rod and tube type temperature responsive device, any temperature responsive device having a member movable in accordance with temperature can be utilized with the present invention.

Casing 18 has an inlet 34 therein for receiving fuel from a suitable supply normally under the control of a fuel cock, not shown, operated by a control knob 36. Casing 18 has an outlet 38 adapted to supply fuel to a burner of an appliance such as a water heater, having an operating temperature sensed by the temperature responsive device 14. Communication between inlet 34 and outlet 38 is controlled by valve means 40 having an annular valve seat 42 through which fuel passes from inlet 34 to outlet 38 and a valve member 44 cooperating with the valve seat 42 to control flow therethrough. The valve member 44 is constructed of a rubber valve face 45 sandwiched between a backup plate 46 and a smaller diameter plate 48, and the valve member 44 is mounted on a valve operating member 50 which has a tubular end 52 extending through the valve member 44 and staked over the plate 48. Operating member 50 has a cage-like body formed of spaced legs 54 providing openings for fuel flow therethrough, and a protrusion 56 extends from the end of operating member 50 opposite end 52. A balancing diaphragm 58 has a bead around the periphery thereof in sealing engagement with a housing 60 mounted in the casing, and an opening is formed in the central portion of diaphragm 58 with a bead along the edge thereof received in an annular recess in operating member 50 to provide with valve member 44 a seal across the mouth of housing 60.

A valve closure member 62 has a body disposed within the cage-like body of operating member 50 and arms 64 extending through the spaces between the legs 54 of the operating member to receive a coiled valve closure spring 66 mounted in compression between housing 60 and arms 64. The valve closure member 62 is axially movable with respect to the operating member 50, and a valve operating stem 68, which is square in cross-section, is slidably received through the tubular end 52 of the operating member 50 independent of movement of the operating member. Valve stem 68 has a head 70 extending within a central bore in closure member 62, and a shoulder 72 is formed on valve stem 68 adjacent head 70 to engage the bottom of the closure member 62 such that the valve stem 68 and the closure member 62 essentially move as one piece. Valve stem 68 has an end 74 adapted to abut the clicker mechanism 32 of the temperature responsive device 14 for movement therewith. A coiled regulator follower spring 76 is mounted in compression between the valve closure member 62 and the operating member 50.

A regulator assembly 78 for the combination thermostat and regulator valve device 10 includes a regulating diaphragm 80 having a peripheral bead in sealing engagement with the casing 18 and carrying centrally thereof a member 82 engaging an end 84 of a regulator lever 86 which has a second end 88 adapted to engage protrusion 56 carried by the operating member 50, the regulator lever 86 extending through an opening in a fulcrum member 90. A coiled spring 92 is mounted in compression between a backup plate 94 carrying regulating diaphragm 80 and a regulating pressure adjusting screw 96 threadedly engaging the casing 18 which has a vent 98 therein such that the back side of the diaphragm 80 is subject to atmospheric pressure through the vent 98 and the pressure from the force of spring 92 while the other side of the regulating diaphragm 80 is subject to the pressure in a regulating chamber 93 formed in the casing 18. A positive stop 100 extends from casing 18 into regulating chamber 93 in alignment with member 82 to limit movement thereof; and, if desired, an adjustable screw stop 102 can be mounted in the casing 18 to abut regulator lever 86 at end 88 to limit movement of the regulator lever.

In operation, when the temperature sensed by temperature responsive device 14 is above the set temperature as adjusted by knob 26, the combination thermostat and regulator valve 10 will be in the closed state illustrated in FIG. 1 with valve face 45 in sealing engagement with valve seat 42 to prevent fuel flow from inlet 34 to outlet 38. In the closed state, the relatively high force from valve closure spring 66 supplies a force to valve closure member 62 to cause the valve closure member to engage the operating member 50 and move the operating member such that the valve face 45 seals with the valve seat 42. An additional closure force is provided by the balancing diaphragm 58 having a slightly less effective area than the valve member 44 thereby increasing the valve closure force as inlet pressure is increased to assure sufficient closure force under varying inlet pressure conditions. Since inlet pressure is sealed from the regulating chamber 93 by the balancing diaphragm 58, the regulating diaphragm 80 will be held in its fully open operation by the regulator spring 92 with member 82 abutting stop 100 or the adjustable stop 102. By limiting the movement of the regulating diaphragm 80, the volume of regulating chamber 93 is controlled to, in turn, permit control of the response time upon opening of the combination thermostat and regulator valve device 10.

Once the temperature sensed by the temperature responsive device 14 drops below the set temperature, movement of rod 12 will operate the clicker assembly 32 to engage the end 74 of valve stem 68 and move the valve stem and the valve closure member 62, as illustrated in FIG. 2, to overcome the force from valve closure spring 66. The movement of valve closure member 62 is transmitted through regulator follower spring 76 to move operating member 50 and, thus, move valve member 44 away from valve seat to open the valve means 40. When the valve means 40 is in the open state, fuel is supplied to outlet 38 and the appliance, and the outlet pressure is supplied to regulating chamber 93 either through the clearance between the valve operating stem 68 and tubular end 52 of the operating member 50 or, alternately, through a passage 104 shown in dashed lines in FIG. 2.

With the combination thermostat and regulator valve device 10 in the open state as illustrated in FIG. 2, the regulator assembly 78 will be responsive to sensed outlet pressure relative to the adjusted regulator setting from the force of regulator spring 92 to move the lever 86 about fulcrum 90 and to, accordingly, control the position of the operating member 50 and the valve member 44 to provide proportional opening or closing of the valve means 40 as required to maintain the set regulated outlet pressure. The regulating spring force is represented by a combination of the force from regulator spring 92 and the force from regulator follower spring 76, and valve member 44 will, accordingly, provide pressure regulation, normally as the last significant restriction in the supply of fuel to the appliance, such that regulation under varying throughput conditions is significantly improved, particularly with respect to prior art control devices having regulators disposed upstream of a separate thermostatic or automatic valve. That is, there will be no major restriction downstream of the combination thermostat and regulator valve device 10 prior to supply of fuel to the appliance thereby assuring that the pressure of fuel supplied to the burner is substantially the same as the regulated outlet pressure from the combination thermostat and regulator valve device 10.

Once sufficient heat has been supplied by the burner to raise the temperature above the set temperature, rod 12 will be moved sufficiently to permit clicker assembly 32 to return to the state illustrated in FIG. 1. Accordingly, valve closure spring 66 will force closure member 62 against operating member 50 to move valve member 44 against valve seat 42 to close valve means 40 and prevent further supply of fuel to the appliance.

Since the regulator assembly 78 commences operation from a full open position after the valve means 40 is opened, the regulator assembly may exhibit overshoot characteristics and initially supply fuel to the appliance at a pressure greater than the set pressure. Accordingly, the combination thermostat and regulator valve device 10 may be modified, as illustrated in FIG. 3, such that the valve closure member 62 has an extension 105 passing through an opening 106 in the operating member 50 to capture end 88 of the regulator lever 86. Thus, the regulator assembly will be placed in its most closed position when valve means 40 is closed; and, upon opening of the valve means 40, the regulator assembly must inspirate air through the vent 98 before reaching its set regulator operating position thereby providing the regulator assembly with a slow opening characteristic to eliminate or minimize initial pressure overshoot.

Another embodiment of a combination thermostat and regulator valve device 110 according to the present invention is illustrated in FIGS. 4 and 5 with parts identical to parts of the embodiment of FIGS. 1 and 2 being given identical reference numbers and not described again. The primary difference between the embodiment of FIGS. 1 and 2 and the embodiment of FIGS. 4 and 5 is that the embodiment of FIGS. 4 and 5 permits soft ignition of the burner in the appliance by loading the regulating diaphragm 80 with inlet pressure when the valve means 40 is closed. Thus, the combination thermostat and regulator valve device 110 includes a passage 111 having a restricting orifice 113 therein communicating between inlet 34 and regulating chamber 93, and valve closure member 62 carries an O-ring 115 on the face thereof to provide sealing engagement between the valve closure member 62 and the operating member 50.

In operation, with valve means 40 closed, inlet pressure is supplied to regulator chamber 93 through passage 111 and restriction 113 to load regulator diaphragm 80 to its closed regulator position. The seal provided by O-ring 115 prevents fuel from flowing to the outlet along valve stem 68. The pressure differential across valve member 44, with balancing diaphragm 58 having inlet pressure on both sides thereof, requires that the pressure above the balancing diaphragm be dissipated before the valve means 40 can fully open. This provides a damped or slow opening effect independent of the regulator assembly 78. Accordingly, upon initial opening of the valve means 40, the regulator assembly starts from its closed position therefore reducing the outlet pressure of fuel initially supplied to the burner in the appliance. The air vent 98 presents a restriction above the regulator diaphragm 80 to slow regulator response upon opening of the valve means; and, thus, the regulator assembly assumes its set regulating position, as illustrated in FIG. 5, after a predetermined delay.

The passage 111 and restriction 113 act to limit the effect of inlet pressure on the regulating diaphragm 80 during operation thereby permitting the regulator assembly 78 to respond to the sensed outlet pressure downstream of valve means 40. That is, with the valve closure member 62 moved by valve stem 68, as illustrated in FIG. 5, the seal provided by O-ring 115 will be broken to permit the regulator chamber 93 to sense outlet pressure through the clearance between valve stem 68 and operating member 50 to permit regulating diaphragm 80 to move lever 86 and provide pressure regulating operation, as described above with respect to the embodiment of FIGS. 1 and 2. Closing of the valve means 40 is accomplished quickly since the operating member 50 operates independently of the regulator lever 86, as compared with the modification of FIG. 3 wherein the regulator lever is captured between the operating member 50 and the valve operator member 62.

Figure 6:
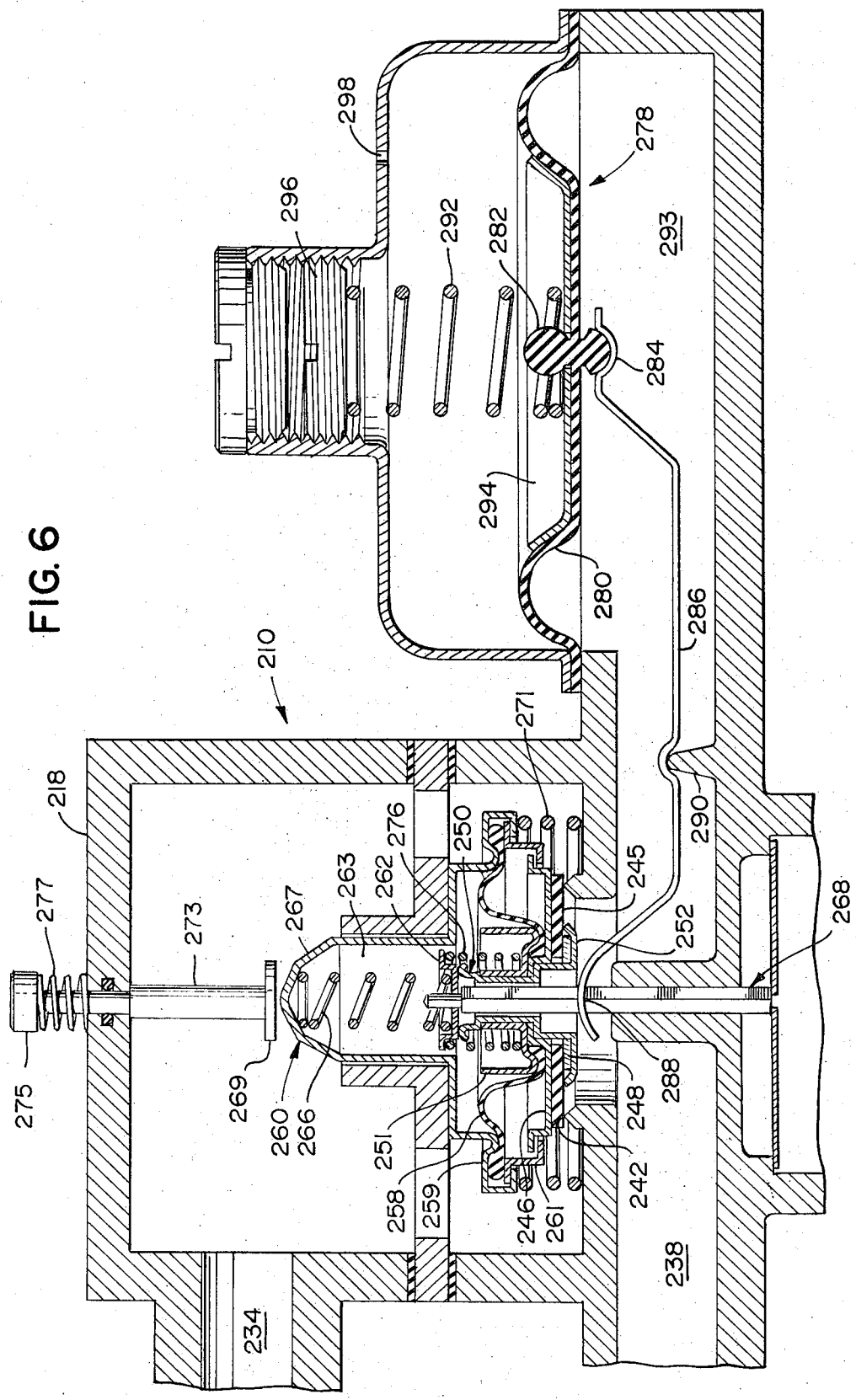
FIGS. 6 and 7 are broken sections of a further embodiment of a combination thermostat and regulator valve device according to the present invention in closed and open states, respectively.
Figure 7:
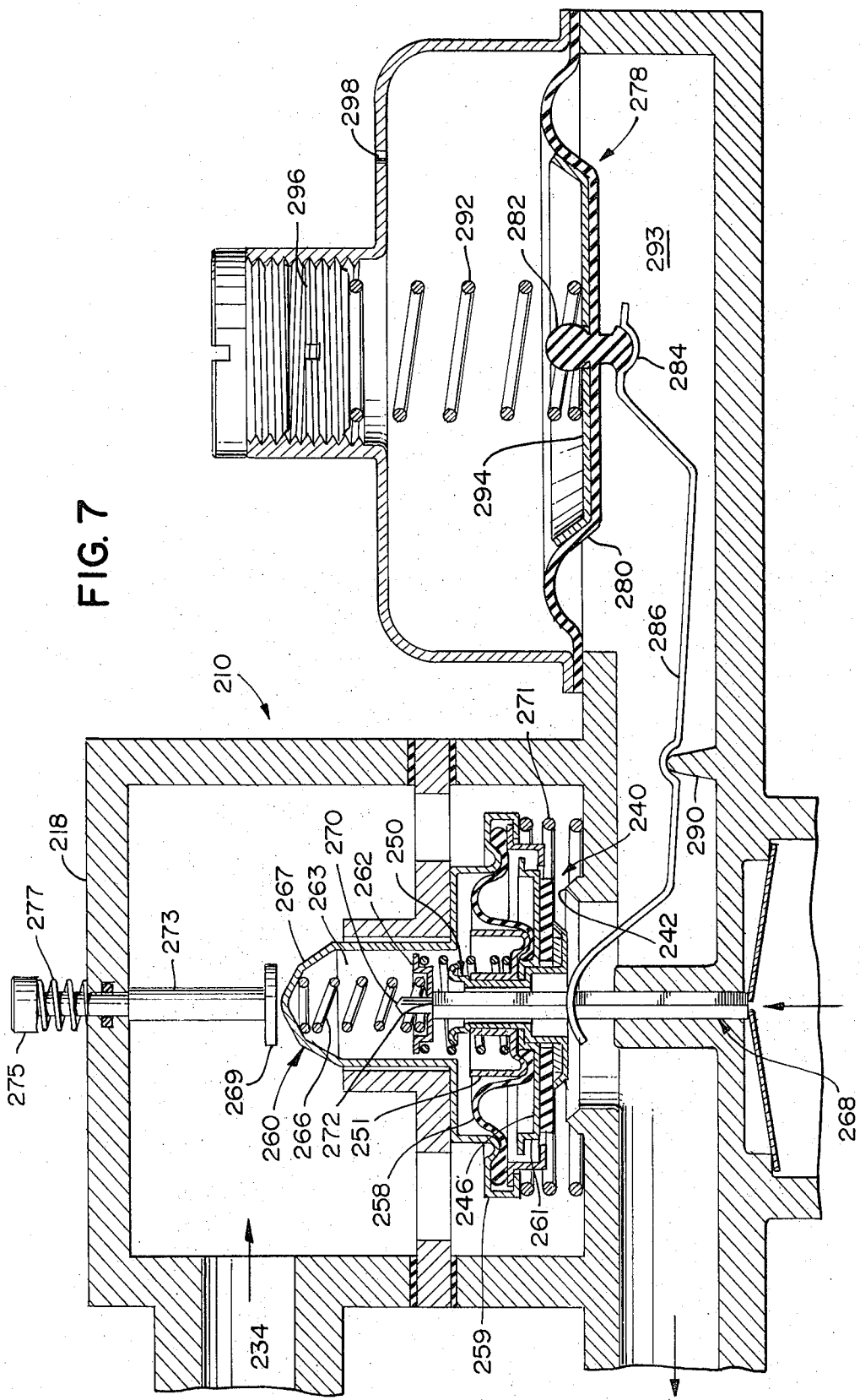

A further embodiment of a combination thermostat and regulator valve device 210 according to the present invention is illustrated in FIGS. 6, 7, and 8 with parts similar to parts of the embodiment of FIGS. 1 and 2 being given reference numbers with 200 added.

The combination thermostat and regulator valve device 210 includes a casing 218 having an inlet 234 therein for receiving fuel from a suitable supply, not shown, and an outlet 238 adapted to supply fuel to a burner of an appliance with communication between inlet 234 and outlet 238 controlled by valve means 240 having an annular valve seat 242 through which fuel passes from inlet 234 to outlet 238 and a valve member 244 cooperating with the valve seat 242 to control flow therethrough. Valve member 244 is constructed of a rubber valve face 245 sanwiched between a cupshaped backup plate 246 and a smaller diameter plate 248. The valve member 244 is mounted on an operating member 250 which has a tubular end 252 staked over the plate 248 and a cupshaped portion 251. A balancing diaphragm 258 has a bead around the periphery thereof in sealing engagement between a flange 259 of a domed housing 260 and a flange of an extension 261. The flange 259 of the housing 260 is bent over the flange of the extension 261 to compress the bead of the balancing diaphragm 258, and an opening is formed in the central portion of the balancing diaphragm 258 with a bead along the edge thereof held in sealing engagement between operating member 250 and backup plate 246. Thus, housing 260 forms a balancing chamber 263 over balancing diaphragm 258.

A coiled valve closure spring 266 is mounted in compression between an upper portion 267 of housing 260 and a cupshaped valve closure member 262. A coiled regulator follower spring 276 is mounted in compression between valve closure member 262 and portion 251 of operating member 250. A valve stem 268, square in cross section, of a temperature responsive device similar to that described with reference to FIG. 1 is slidably received in tubular end 252 of operating member 250 and has a head 270 received in a central opening of closure member 262 and a shoulder 272 for engaging the bottom of the closure member. Housing 260 is biased against a partition wall in casing 218 with upper portion 267 slightly spaced from a stop 269 by a coiled inlet pressure opposing spring 271 mounted in compression between flange 259 and the casing 218, stop 269 being movable by means of a rod 273 extending through casing 218 in sealing engagement therewith to an actuator button 275. The stop 269 is normally biased to the operating position illustrated in FIG. 7 by means of a coiled spring 277.

A regulator assembly 278 for the combination thermostat and regulator valve device 210 includes a regulating diaphragm 280 having a peripheral bead in sealing engagement with the casing 218 and carrying centrally thereof a member 282 engaging an end 284 of a regulator lever 286 which has a second bifurcated end 288 adapted to engage end 252 of operating member 250, the regulator lever 286 being pivotal on a fulcrum 290 formed in a wall of the casing 218. A coiled regulator spring 292 is mounted in compression between a backup plate 294 carrying regulating diaphragm 280 and a pressure adjustment screw 296 threadedly engaging the casing 218 which has a vent 298 therein such that the backside of the diaphragm 280 is subjected to atmospheric pressure through the vent 298 along with the pressure from the force of regulating spring 292 while the other side of the regulating diaphragm 280 is subject to the pressure in a regulating chamber 293 in direct communication with outlet 238.

The operation of the combination thermostat and regulator valve device 210 is similar to that described with respect to combination thermostat and regulator valve device 10 of FIGS. 1 and 2 in that, when the temperature sensed by the temperature responsive device is above the set temperature, valve member 244 is forced against valve seat 242 by the force of valve closure spring 266 moving closure member 262 to engage operating member 250 since valve stem 268 is moved such that shoulder 272 is spaced from closure member 262, as shown in FIG. 6. The inlet pressure opposing spring 271 biases housing 260 against the partition wall in casing 218 with sufficient force to overcome the pressure differential across the valve member 244; however, under lower pressure differential conditions spring 271 is not required in that valve closure spring 266 provides sufficient force to bias housing 260 against the partition wall in casing 218.

When the temperature sensed by the temperature responsive device drops below the set temperature, the clicker assembly will move valve stem 268 such that shoulder 272 engages closure member 262 to move the closure member away from operating member 250 against the force of closure spring 266, as shown in FIG. 7. Thus, the force from regulator spring 292 applied through lever 286 will move the valve member 244 away from the valve seat 242 to open the valve means 240 which is essentially pressure balanced. Immediately upon opening of the valve means 240, regulating diaphragm 280 is subjected to outlet pressure in chamber 293, and valve member 244 is moved by regulating diaphragm 280 and lever 286 to provide outlet pressure regulation, valve member 244 following movement of lever 286 due to regulator follower spring 276 maintaining contact between operating member 250 and end 288 of lever 286. The valve means 240 is pressure balanced since the pressure differential between inlet and outlet pressures on the opposite sides of valve member 244 tending to close the valve is approximately balanced by the same pressure differential across balancing diaphram 258 tending to open the valve. Thus, pressure regulating control of the valve means 240 is accomplished primarily as a function of outlet pressure sensed by regulating diaphragm 280.

Once the temperature is raised above the set temperature, the temperature responsive device will permit valve closure spring 266 to force closure member 262 into engagement with operating member 250 to close valve means 240.

The combination thermostat and regulator valve device 210 can be manually placed in the closed state by depressing actuator button 275 to move stop 269 and housing 260, as shown in FIG. 8, the casing 218 being provided with detents, not shown, to hold button 275 down. The movement of housing 260 causes a shoulder of the housing to engage cupshaped portion 251 of operating member 250 to compress spring 271 and force valve member 244 against valve seat 242 to close the valve means 240. Manual closure of the combination thermostat and regulator valve device 210 can be accomplished even with the temperature responsive device calling for more heat.

From the above, it can be seen that combination thermostat and regulator valve devices according to the present invention permit a single valve means to provide on-off thermostat operation as well as pressure regulation without requiring intermediary control elements or valves, the use of a balancing diaphragm being particularly effective in providing such dual function operation.

Inasmuch as the present invention is subject to many variations, changes in detail and reversal of components, it is intended that all matter contained in the foregoing description or shown on the accompanying drawing shall be interpreted as illustrative and not in a limiting sense.

What is claimed is:
1. A combination thermostat and regulator device for controlling fuel flow to an appliance in response to movement of a temperature responsive device comprising a casing having an inlet for receiving fuel from a supply and an outlet for supplying fuel to the appliance; valve means including a valve seat formed in said casing and a valve member cooperating with said valve seat to control fuel flow through said casing between said inlet and said outlet; closure means controlling said valve member and movable in response to movement of the temperature responsive device to move said valve member against said valve seat to place said valve means in a closed state and to move away from said valve member to permit said valve member to move away from said valve seat to place said valve means in an open state; and regulator means including diaphragm means movable in response to pressure at said outlet and means engaging said diaphragm means and said valve means to transmit movement of said diaphragm in response to outlet pressure to said valve member when said valve means is in said open state to regulate pressure at said outlet whereby said valve means is responsive to said operator means and said regulator means to provide thermostat and regulator operation; said valve means including an operating member carrying said valve member and said regulator means including lever means pivotally mounted on a fulcrum in said casing and having a first end movable with said diaphragm means and a second end engaging said operating member to move said valve member to regulate pressure at said outlet.

2. A combination thermostat and regulator device as recited in claim 1 wherein said regulator means including a follower spring mounted in compression between said operating member and said closure means.

3. A combination thermostat and regulator device as recited in claim 2 wherein said closure means includes a closure member engaging said operating member when said valve means is in said closed state and movable relative to said operating member to a position out of engagement with said operating member when said valve means is in said open state, and a valve stem engaging said closure member and extending through said operating member and said valve member to an end adapted to be contacted by the temperature responsive device.

4. A combination thermostat and regulator device as recited in claim 3 wherein said closure means includes closure spring means biasing said closure member toward said operating member to place said valve means normally in said closed state.

5. A combination thermostat and regulator device as recited in claim 4 and further comprising balancing diaphragm means sealably engaging said valve member to permit pressure regulating movement of said valve member primarily in response to said regulator means.

6. A combination thermostat and regulator device as recited in claim 5 wherein said operating member has a tubular end slidably receiving said valve stem and permitting fuel flow in the space between said tubular end and said valve stem.

7. A combination thermostat and regulating device as recited in claim 6 wherein said regulator means includes regulating chamber communicating with said outlet through said space between said tubular end of said operating member and said valve stem.

8. A combination thermostat and regulating device as recited in claim 7 wherein said second end of said lever means is captured by said closure member.

9. A combination thermostat and regulating device as recited in claim 8 wherein said regulator means includes stop means limiting movement of said diaphragm means.

10. A combination thermostat and regulating device as recited in claim 9 wherein said stop means includes an adjustable stop for abutting said lever means.

11. A combination thermostat and regulating device as recited in claim 7 wherein said regulating chamber communicates with said inlet through a passage having a restriction therein whereby said regulating chamber has inlet pressure therein when said valve means is in said closed state.

12. A combination thermostat and regulating device as recited in claim 5 and further comprising a housing sealably engaging said balancing diaphragm means to define a balancing chamber, and passage means communicating between said outlet and said balancing chamber.

13. A combination thermostat and regulating device as recited in claim 12 wherein said operating member has an end fixed to said valve member and said second end of said lever means engages said end of said operating member.

14. A combination thermostat and regulating device as recited in claim 13 wherein said housing is manually movable against said operating member to force said valve member against said valve seat and place said valve means in said closed state.

15. A combination thermostat and regulating device as recited in claim 12 wherein said housing is manually movable against said operating member to force said valve member against said valve seat and place said valve means in said closed state.

16. A combination thermostat and regulating device for controlling fuel flow to an appliance in response to movement of a temperature responsive device comprising a casing having an inlet for receiving fuel from a supply and an outlet for supplying fuel to to the appliance; valve means including a valve seat formed in said casing and a valve member cooperating with said valve seat to control fuel flow through said casing between said inlet and said outlet; closure means controlling said valve member and movable in response to movement of the temperature responsive device to move said valve member against said valve seat to place said valve means in a closed state, and to move away from said valve member to permit said valve member to move away from said valve seat to place said valve means in an open state; regulator means including diaphragm means movable in response to pressure at said outlet and means engaging said diaphragm means and said valve means to transmit movement of said diaphragm in response to outlet pressure to said valve member when said valve means is in said open state to regulate pressure at said outlet whereby said valve means is responsive to said operator means and said regulator means to provide thermostat and regulator operation; and balancing diaphragm means sealably engaging said valve member to permit pressure regulating movement of said valve member primarily in response to said regulator means.

17. A combination thermostat and regulating device for controlling fuel flow to an appliance in response to movement of a temperature responsive device comprising a casing having an inlet for receiving fuel from a supply and an outlet for supplying fuel to the appliance; valve means including a valve seat formed in said casing and a valve member cooperating with said valve seat to control fuel flow through said casing between said inlet and said outlet; closure means controlling said valve member and movable in response to movement of the temperature responsive device to move said valve member against said valve seat to place said valve means in a closed state and to move away from said valve member to permit said valve member to move away from said valve seat to place said valve means in an open state; and regulator means including diaphragm means movable in response to pressure at said outlet and means engaging said diaphragm means and said valve means to transmit movement of said diaphragm in response to outlet pressure to said valve member when said valve means is in said open state to regulate pressure at said outlet whereby said valve means is responsive to said operator means and said regulator means to provide thermostat and regulator operation; said valve means including an operating member carrying said valve member and said closure means including a closure member engaging said operating member when said valve means is in said closed state and movable relative to said operating member to a position out of engagement with said operating member when said valve means is in said open state, and a valve stem engaging said closure member and extending through said operating member and said valve member to an end adapted to be contacted by the temperature responsive device.

18. A combination thermostat and regulating device as recited in claim 17 wherein said operating member has a tubular end slidably receiving said valve stem and permitting fuel flow in the space between said tubular end and said valve stem.

* * * * *